Nov. 11, 1924.

E. H. BISHOP 1,515,332

TRACTION CHAIN ADJUSTER

Filed Dec. 15, 1923

INVENTOR
Earl H. Bishop

Patented Nov. 11, 1924.

1,515,332

UNITED STATES PATENT OFFICE.

EARL H. BISHOP, OF BUTLER, PENNSYLVANIA, ASSIGNOR TO DAUBENSPECK CHAIN COMPANY, OF BUTLER, PENNSYLVANIA, A CORPORATION OF PENNSYLVANIA.

TRACTION-CHAIN ADJUSTER.

Application filed December 15, 1923. Serial No. 680,870.

*To all whom it may concern:*

Be it known that I, EARL H. BISHOP, a citizen of the United States, residing at Butler, county of Butler, and State of Pennsylvania, have invented a new and useful Improvement in Traction-Chain Adjusters, of which the following is a full, clear, and exact description.

This invention relates to traction chain adjusters and is particularly useful in connection with traction chains used on automobile wheels.

I provide a chain adjuster including a frame and a spring carried thereby, the spring being adapted to be carried by the frame in a substantially fixed manner when not in use. This is preferably accomplished by providing an adjuster wherein the frame is formed of a continuous piece of metal adapted to surround the wheel hub, and having attached thereto one or more springs loosely fastened to the frame by one end and with hooks at the other end adapted to engage the traction chain. When the device is not in use, the hooks are fastened over a suitable portion of the frame, thereby forming a neat and compact article which may be readily stored in a tool box or under the automobile seat until it is put into use.

Figure 1:
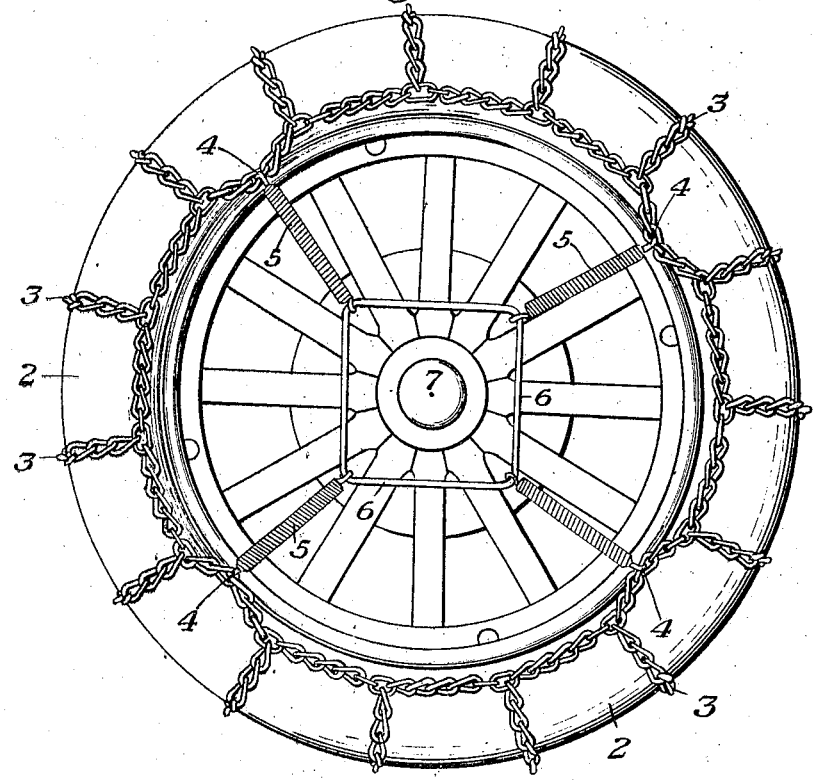
Figure 2:
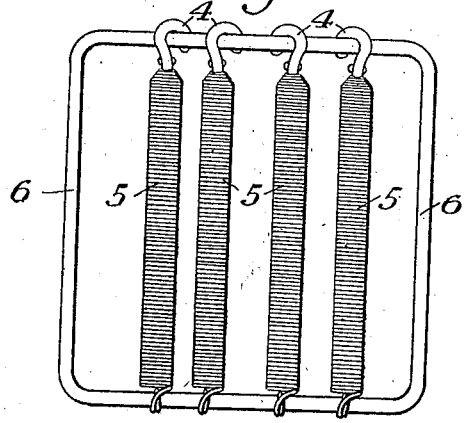

In the accompanying drawings illustrating the present preferred embodiment of the invention, Figure 1 is a side elevation of an automobile wheel provided with a traction chain and having my invention applied thereto; and Figure 2 is a side view, on an enlarged scale, of the apparatus ready to be stored away.

In the illustrated embodiment of the invention, there is shown an automobile wheel 2 provided with a traction chain 3 of any desired type. The traction chain is engaged by a plurality of hooks 4 attached to the outer ends of tension springs 5. The springs are connected at their inner ends to a frame 6 formed of a continuous bar of metal and in the form of a regular polygon having as many apexes as there are springs. As clearly seen from Figure 1, the frame surrounds the hub 7 of the wheel and serves to interconnect all of the springs 5.

When it is desired to store the adjuster, it is removed from the wheel. The springs 5 are slipped around the frame 6 until all of them are lying at one side thereof and the hooks 4 are then sprung over an opposite side of the frame. This results in a neat, compact article, as shown in Figure 2, which may be readily stored in a small space until it is again used.

It will be seen from the foregoing that the frame is preferably of a regular polygonal form having as many apexes as there are springs. Also that there is preferably provided an even number of springs which tend to travel to the apexes of the frame when applied, thus insuring even spacing around the bar. The springs are also preferably of a length substantially equal to the width of the polygon and this, with a polygon having an even number of sides, makes it very easy to put the apparatus in the condition shown in Figure 2 for storage.

The apparatus is simple, strong and efficient and may be applied to varying sizes of wheels simply by stretching the springs. It is therefore possible to accommodate the entire range of wheel sizes with a very few sizes of adjusters.

While I have shown the preferred form of my invention, it will be understood that it is not limited thereto but may be otherwise embodied within the scope of the following claims.

I claim:

1. An adjuster for wheel chains, including a rigid frame, and a spring loosely secured thereto by one end, the spring being adapted to be carried by the frame in a substantially fixed manner when not in use, substantially as described.

2. An adjuster for wheel chains, including a rigid frame, a spring loosely secured thereto by one end, and a hook on the spring adapted to engage the wheel chain when the adjuster is in use or to engage the frame when it is not in use, substantially as described.

3. An adjuster for wheel chains, including a frame adapted to surround the hub of the wheel, and a plurality of springs carried by the frame, the springs being adapted to be held by the frame in a substantially fixed manner when not in use, substantially as described.

4. An adjuster for wheel chains, including a frame adapted to surround the hub of the wheel, a plurality of springs fastened by one end to the frame, and hooks on the remote ends of the springs, the hooks being adapted to engage the wheel chain when the adjuster is in use and to engage the frame when it is not in use, substantially as described.

5. An adjuster for wheel chains, including a frame formed of a continuous piece of metal, and a plurality of springs loosely mounted thereon, the springs being adapted to be held by the frame in a substantially fixed manner when the adjuster is not in use, substantially as described.

6. An adjuster for wheel chains, including a frame formed of a continuous piece of metal having two substantially parallel sides, a plurality of springs loosely mounted on the frame at one end, and hooks at the other ends of the springs adapted to engage the wheel chain when the adjuster is in use, the springs being slidable around the frame to one of the parallel sides and the hooks being adapted to engage the other parallel side when the adjuster is not in use, substantially as described.

7. An adjuster for wheel chains, including a frame formed of a continuous piece of metal, and tension springs loosely mounted thereon adapted to be stretched and fastened to the wheel chain, the frame having portions to which the springs will travel when they are pulled, the springs being adapted to be carried by the frame in a substantially fixed manner when not in use, substantially as described.

8. An adjuster for wheel chains, including a frame formed of a continuous piece of metal, and a plurality of tension springs mounted thereon adapted to be stretched and fastened to the wheel chain, the frame having a plurality of equally spaced portions to which the springs will travel when they are pulled, there being as many of such frame portions as there are springs, the springs being adapted to be carried by the frame in a substantially fixed manner when not in use, substantially as described.

9. An adjuster for wheel chains, including a frame of regular polygonal form having a plurality of tension springs loosely mounted thereon, the frame having as many apexes as there are springs, the springs being adapted to be carried by the frame in a substantially fixed manner when not in use, substantially as described.

10. An adjuster for wheel chains, including a frame of regular polygonal form with an even number of sides, springs of a length substantially equal to the width of the polygon loosely mounted thereon, there being the same number of springs as there are sides, and a hook on each spring adapted to engage the wheel chain when the adjuster is in use or to a side of the polygon opposite the side where the spring is attached when the adjuster is not in use, substantially as described.

11. An adjuster for wheel chains, including a frame, and a connecting member adapted to engage the wheel chain, the connecting member being adapted to be carried by the frame in a substantially fixed manner when the adjuster is not in use, substantially as described.

12. An adjuster for wheel chains, including a square frame formed of a continuous piece of metal rod, and tension springs slidably mounted thereon adapted to be stretched and fastened to the wheel chain, the springs having hooks at the remote ends thereof for fastening to the wheel chain, the springs being slightly shorter than the width of the square frame and adapted to be slipped to one side of such frame and have the hooks fastened over the opposite side to hold the springs tightly when the adjuster is not in use, substantially as described.

In testimony whereof I have hereunto set my hand.

EARL H. BISHOP.